US012605988B2

(12) United States Patent
Doroudian et al.

(10) Patent No.: US 12,605,988 B2
(45) Date of Patent: Apr. 21, 2026

(54) HOOD CLOSURE ASSIST SYSTEM

(71) Applicant: FCA US LLC, Auburn Hills, MI (US)

(72) Inventors: Mark Doroudian, Novi, MI (US);
Milind Khedkar, Pune (IN); **D
Vamsidhar**, Chennai (IN)

(73) Assignee: FCA US LLC, Auburn Hills, MI (US)

( * ) Notice: Subject to any disclaimer, the term of this
patent is extended or adjusted under 35
U.S.C. 154(b) by 359 days.

(21) Appl. No.: 18/494,214

(22) Filed: Oct. 25, 2023

(65) Prior Publication Data

US 2025/0135839 A1      May 1, 2025

(51) Int. Cl.
B60H 1/24          (2006.01)
B60R 5/02          (2006.01)

(52) U.S. Cl.
CPC .............. B60H 1/248 (2013.01); B60R 5/02
(2013.01)

(58) Field of Classification Search
CPC .......... B60H 1/248; B60H 1/249; B60H 1/24;
B60R 5/02; B60R 16/08; B62D 25/10;
B62D 25/105; B62D 25/12
See application file for complete search history.

(56) References Cited

U.S. PATENT DOCUMENTS

| | | | |
|---|---|---|---|
| 6,276,477 B1 | 8/2001 | Ida | |
| 6,409,591 B1 * | 6/2002 | Sullivan | B60H 1/249 |
| | | | 137/512.1 |

| | | | |
|---|---|---|---|
| 9,102,217 B2 * | 8/2015 | Stauffer | B60J 5/04 |
| 9,616,731 B2 * | 4/2017 | Koberstein | B60H 1/249 |
| 10,173,736 B2 * | 1/2019 | Ribaldone | B62D 35/005 |
| 11,247,537 B2 * | 2/2022 | Chevalier | B60H 1/262 |
| 11,414,904 B2 | 8/2022 | Klein et al. | |
| 12,365,216 B2 * | 7/2025 | Hrecznyj | B60R 7/02 |
| 12,365,288 B2 * | 7/2025 | Mellergård | B60R 5/02 |
| 12,403,813 B2 * | 9/2025 | Harris | B60P 7/065 |
| 12,448,060 B2 * | 10/2025 | Moradnia | B60W 40/1005 |
| 2005/0282485 A1 * | 12/2005 | Kato | B60H 1/243 |
| | | | 454/136 |
| 2024/0109602 A1 * | 4/2024 | Jierian | B60H 1/249 |
| 2025/0376219 A1 * | 12/2025 | Jatzke | B62D 25/087 |

FOREIGN PATENT DOCUMENTS

| | | | |
|---|---|---|---|
| JP | H0811622 A | * | 1/1996 |
| JP | 6276477 B2 | | 2/2018 |

* cited by examiner

*Primary Examiner* — Jason S Morrow

(74) *Attorney, Agent, or Firm* — Jeremy J. Klobucar

(57) ABSTRACT

A vehicle storage space closing assist system has an air inlet
portal in the storage space to enable air to exit from the
storage space upon closing a hood covering the storage
space. A conduit directs air away from the storage space
upon closing of the hood. A bladder couples with the conduit
to receive pressurized air upon closing of the hood. An outlet
portal is coupled with the conduit to enable exiting of the
pressurized air back into the storage space upon opening of
the hood.

10 Claims, 3 Drawing Sheets

HOOD CLOSURE ASSIST SYSTEM

FIELD

The present disclosure relates to vehicles and, more particularly, to a closure assist system for a vehicle front storage space or frunk.

BACKGROUND

This section provides background information related to the present disclosure which is not necessarily prior art.

In electric vehicles, an engine compartment, like those of traditional internal combustion engines, is not required. Accordingly, designers utilize the space for storage. Accordingly, it is desirable to seal off the space from the entrance of water, dirt, air or the like. Generally, a hood or cover is positioned onto the storage space to seal with an elastomer seal to prevent containments from entering the space. However, during closing of the hood or cover, due to the sealing, pressurized air is created in the storage space and is trapped by the hood seal. This necessitates additional force to push against the hood which necessitates an increase in the closing effort.

The vehicle grille may include openings or the like connected with the storage space to enable the frunk to vent to ambient pressure. However, due to the open loop of these grille openings to the storage space, water, dirt or the like may enter, from ambient, through the grille into the storage space. Thus, it would be desirable to have a system that enables the hood to be closed with less effort without allowing precipitation, dirt or the like to enter from into the storage space or frunk.

Accordingly, the present disclosure provides such a system. The present disclosure provides a system that directs the pressurized air in the frunk to outline sealed areas. The present disclosure enables the pressurized air to be captured and then return into the frunk upon opening of the hood without enabling precipitation, dirt or the like to enter the frunk. Thus, the present disclosure provides a closure assist without enabling ambient air to enter the storage space or frunk during opening and closing of the hood.

SUMMARY

This section provides a general summary of the disclosure, and is not a comprehensive disclosure of its full scope or all of its features.

According to the disclosure, a vehicle closure assist system comprises an air inlet portal in the storage space to enable air to exit from the storage space upon closing a hood covering the storage space. A conduit directs the air away from the storage space upon closing of the hood. A bladder, that may be an inflatable bladder, is coupled with the conduit to receive the pressurized air from the storage space upon closing of the hood. An outlet portal is coupled with the conduit to enable exiting of the pressurized air from the bladders into the storage space upon opening of the hood. The system is closed loop to prohibit precipitation, dust or the like from entering the storage space. The inlet and outlet may be the same portal. The bladder expands upon receiving the pressurized air. The storage space is sealed by the hood upon closing.

According to a second aspect of the disclosure, a vehicle with a storage space comprises an open box shape containment member including a wall and a floor positioned inside the vehicle. A hood covers the opening of the containment member. A seal surrounds the opening of the containment member. The seal contacts the hood when it is in its closed position to provide an airtight seal pressuring air within the containment member. A vehicle space closure assist system comprises an air inlet portal in the storage space to enable air to exit from the storage space upon closing of a hood covering the storage space. A conduit directs the air away from the storage space upon closing of the hood. A bladder, that may be an inflatable bladder, is coupled with the conduit to receive pressurized air in the storage space upon closing of the hood. An outlet portal is coupled with the conduit to enable exiting of the pressurized air from the bladder into the storage space upon opening of the hood. The system is closed loop to prohibit precipitation, dust or the like from entering the storage space. The inlet and outlet may be the same portal. The bladder expands upon receiving the pressurized air. The storage space is sealed by the hood upon closing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
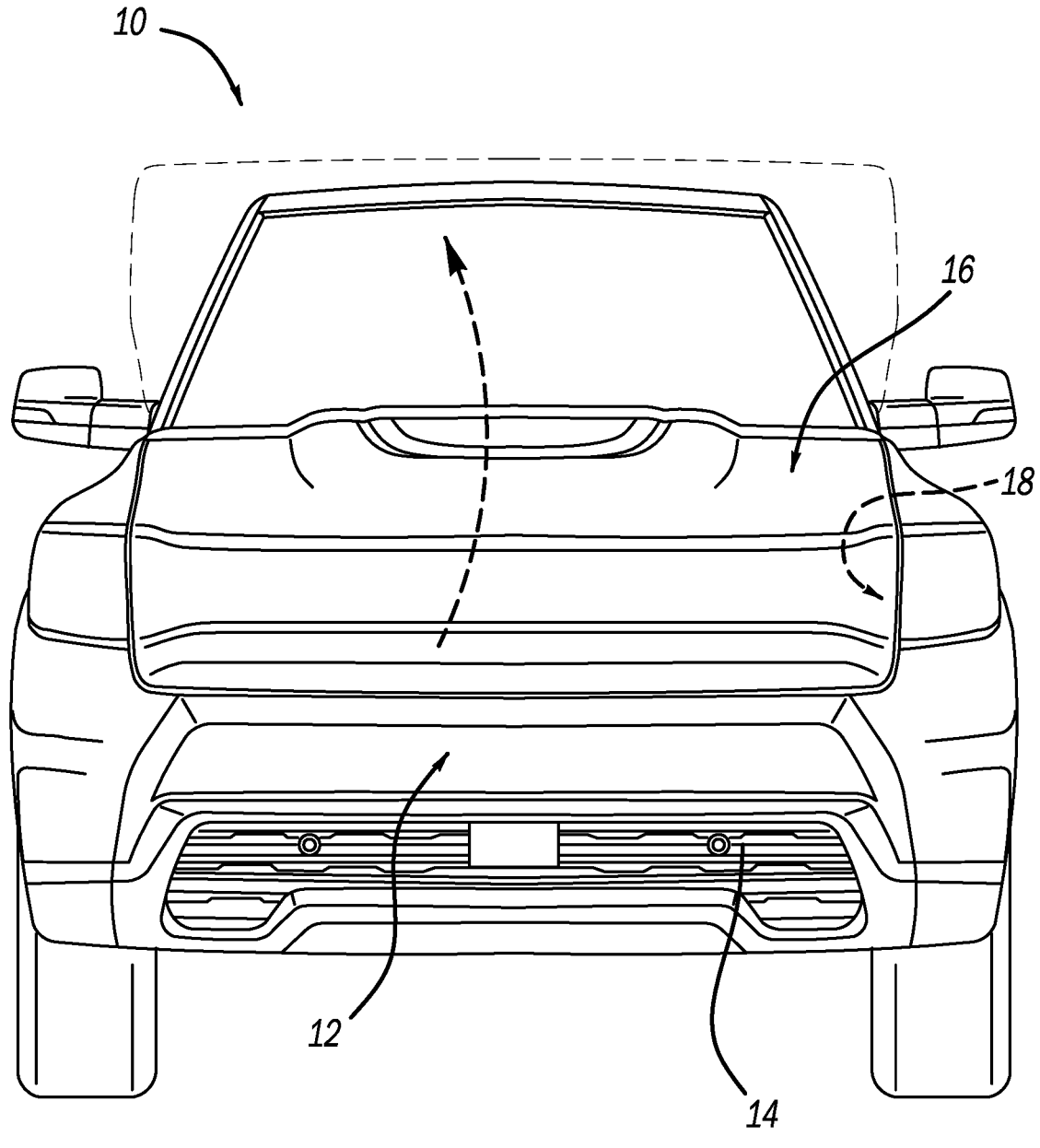
FIG. 1 is a perspective view of a vehicle with the hood closed in accordance with the disclosure.
Figure 2:
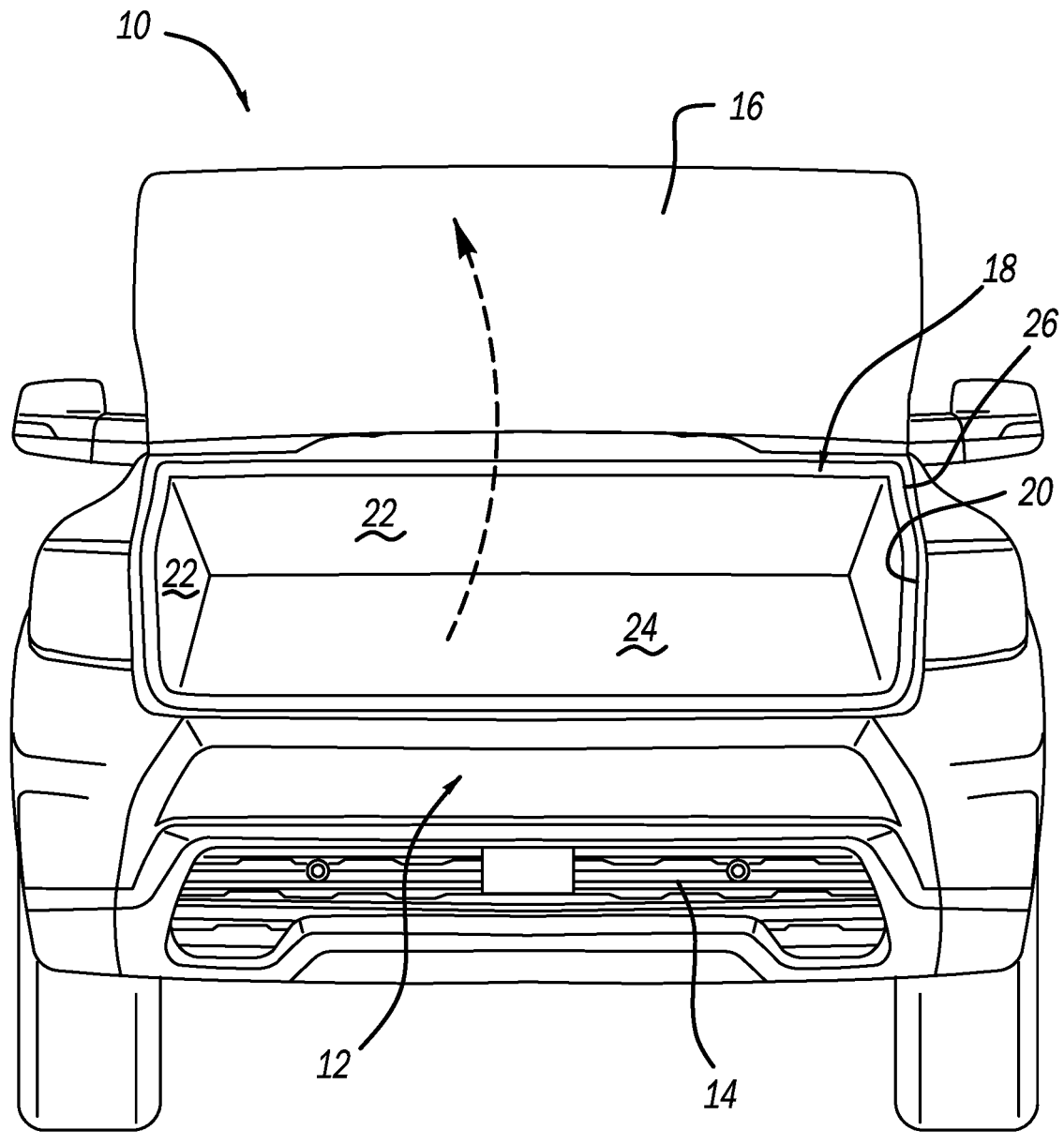
FIG. 2 is a view like FIG. 1 with the hood in an open position.
Figure 3:
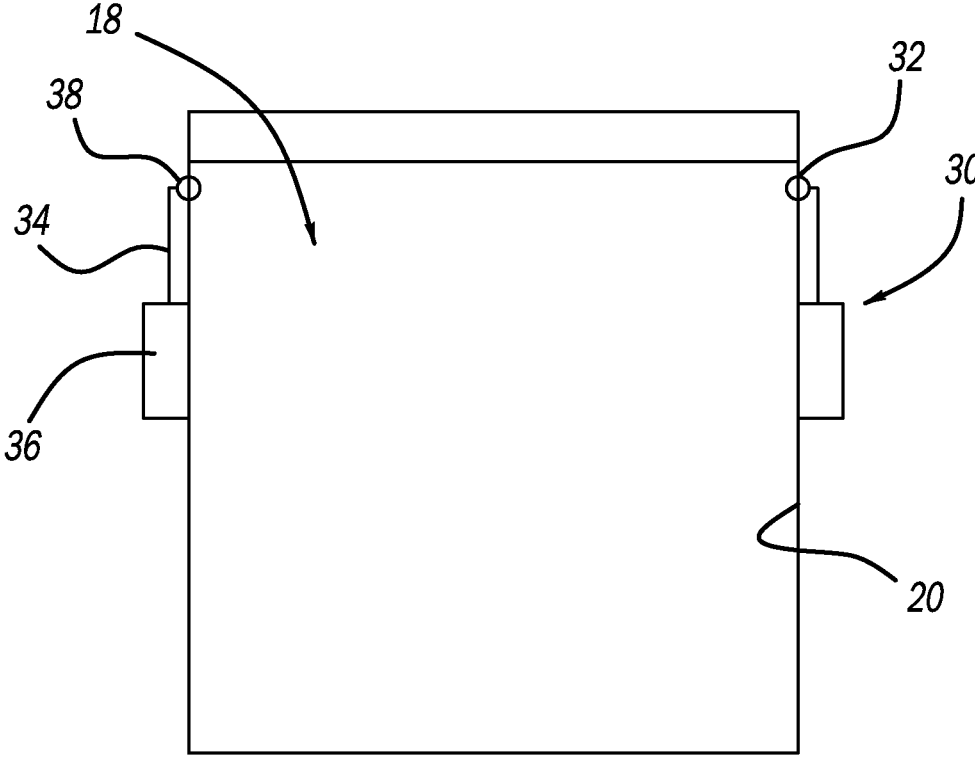
FIG. 3 is a schematic view of the assist system.

Example embodiments will now be described more fully with reference to the accompanying drawings.

Turning to the figures, a vehicle is illustrated and designated with the reference numeral 10. The vehicle 10 includes a front end 12 with a grille 14 and a hood 16 covering a storage space or frunk 18.

The frunk 18 has an overall open box shape containment member 20 defining the interior of the frunk 18. The containment member 20 includes a surrounding wall 22 that could be a continuous wall or could be made of several wall structures. A floor 24 defines the bottom of the frunk space. The walls 22 extend from the floor 24.

A seal 26 surrounds the containment member 20 on the fenders, front and rear portion of the vehicle front end. The seal 26 surrounds the opening to enable the hood 16, when it is in its closed position as in FIG. 1, to seal the frunk 18 from the environmental conditions such as water, precipitation, dust, dirt or the like. Thus, the seal 26, when the hood 16 is in a closed position, provides a substantially airtight containment member 20 of the frunk 18.

A closure assist system 30 enhances closing of the hood 16 with less effort during compressing of the air within the frunk 18 upon closure. The closure system 30 includes an inlet portal 32 in the wall 22 of the containment member 20. The inlet portal 32 enables air trapped in the frunk to exit the containment member 20. The inlet portal 32 is coupled with a conduit 34. The conduit 34 is coupled with a bladder 36.

Thus, as the hood 16 is closed, compressed air in the frunk 18 passes into the inlet portal 32 and, in turn, into the conduit 34 to the bladder 36. The bladder 36 is inflatable and expands upon receipt of the pressurized air from the frunk 18 cavity. Thus, as the pressurized air is moved into the bladder 36 and the bladder 36 expands, the hood 16 is easily closed by the user. The system provides a closed loop so that the air trapped in the bladder exits, via the outlet portal 38, back into the frunk 18 space in the containment member 20. Thus, this closed loop system prohibits water, precipitation, dust, dirt or the like from entering, from ambient, into the frunk 18 space. Thus, the storage space is kept clean and is devoid of dirt and dust from the ambient entering through the walls of the containment member.

The present disclosure provides a cost effective way to vent pressurized air from the frunk 18 space by saving tooling costs of a hood inner venting system. The frunk bladder 36 also prevents dust and water from entering the closed off frunk 18 space.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle storage space closing assist system comprising:
   an air inlet portal in the storage space for enabling air to exit from the storage space upon closing a hood covering the storage space;
   a conduit for directing air away from the storage space upon closing of the hood; and
   a bladder coupled with the conduit for receiving pressurized air upon closing of the hood; and an outlet portal coupled with the conduit for enabling exiting of the pressurized air into the storage space upon opening of the hood.

2. The closing assist system of claim 1, wherein the system is a closed loop system.

3. The closing assist system of claim 1, wherein the inlet and outlet are the same portal.

4. The closing assist system of claim 1, wherein the bladder expands upon receiving the pressurized air.

5. The closing assist system of claim 1, wherein the storage space is sealed by the hood.

6. A vehicle with a storage space comprising:
   an open box shaped containment member including a wall and a floor positioned inside the vehicle;
   a hood covering the opening of the containment member;
   a seal surrounding the opening of the containment member, the seal contacting the hood when it is closed to provide an airtight seal pressurizing air in the containment member;
   an air inlet portal in the storage space for enabling air to exit from the storage space upon closing a hood covering the storage space;
   a conduit for directing air away from the storage space upon closing of the hood;
   a bladder coupled with the conduit for receiving pressurized air upon closing of the hood; and
   an outlet portal coupled with the conduit for enabling exiting of the pressurized air from the bladder into the storage space upon opening of the hood.

7. The vehicle with storage space of claim 1, wherein the system is a closed loop.

8. The vehicle with storage space of claim 6, wherein the inlet and outlet are the same portal.

9. The vehicle with storage space of claim 6, wherein the bladder expands upon receiving the pressurized air.

10. The vehicle with storage space of claim 6, wherein the storage space is sealed by the hood.

* * * * *